(12) United States Patent
Wynne-Powell et al.

(10) Patent No.: US 7,639,210 B2
(45) Date of Patent: Dec. 29, 2009

(54) MULTI-DEPTH DISPLAYS

(75) Inventors: Thomas Wynne-Powell, West Bridgford (GB); David Montgomery, Bampton (GB); Allan Evans, Cowley (GB)

(73) Assignee: Sharp Kabushiki Kaisha, Osaka (JP)

( * ) Notice: Subject to any disclaimer, the term of this patent is extended or adjusted under 35 U.S.C. 154(b) by 534 days.

(21) Appl. No.: 11/553,078

(22) Filed: Oct. 26, 2006

(65) Prior Publication Data
US 2007/0097019 A1    May 3, 2007

(30) Foreign Application Priority Data
Oct. 31, 2005    (GB) ................. 0522142.9

(51) Int. Cl.
*G09G 3/00* (2006.01)
(52) U.S. Cl. .............. 345/32; 345/7; 345/204; 348/54
(58) Field of Classification Search ........ 345/8, 345/13, 15, 32, 204, 7, 10, 214, 426, 584; 353/10, 82; 359/629, 630; 348/54, 59, 60; 349/9; 352/86; 382/154
See application file for complete search history.

(56) References Cited

U.S. PATENT DOCUMENTS

| 4,333,715 | A | 6/1982 | Brooks |
| 4,670,744 | A | 6/1987 | Buzak |
| 4,736,214 | A | 4/1988 | Rogers |
| 6,560,026 | B2 | 5/2003 | Gardiner |
| 6,937,400 | B2 * | 8/2005 | Olsson ............... 359/630 |
| 7,113,349 | B2 * | 9/2006 | Takahashi ........... 359/726 |
| 2002/0105516 | A1 | 8/2002 | Tracy |
| 2002/0163482 | A1 | 11/2002 | Sullivan |
| 2004/0029636 | A1 | 2/2004 | Wells |

(Continued)

FOREIGN PATENT DOCUMENTS

EP    0 454 423    10/1991

(Continued)

OTHER PUBLICATIONS

New F 500 Mind research vehicle from Mercedes showcases the automotive technology of the future:; Daimler Chrysler, http://www.daimlerchrysler.com/dccom/0-5-7154-1-150005-1-0-0-149730-0-0-8-7145-0-0-0-0-0-0-0 html.

*Primary Examiner*—Abbas I Abdulselam
(74) *Attorney, Agent, or Firm*—Renner, Otto, Boisselle & Sklar, LLP (57) ABSTRACT

A multi-depth display apparatus comprises: a display panel comprising pixels arranged to display first image and second images; and a direction changing layer arranged so that light forming said first and second images enters the layer and then exits the layer, wherein: in relation to the light forming said first image, the direction of the light is changed by the layer so that the light exiting the layer is changed in direction by a first angle relative to the light entering the layer; in relation to the light forming said second image, the direction of the light is changed by the layer so that the light exiting the layer is changed in direction by a second angle relative to the light entering the layer; and said first and second angles are different to create a difference in perceived depth between said first and second images when viewed by a user.

37 Claims, 10 Drawing Sheets

U.S. PATENT DOCUMENTS

| | | | |
|---|---|---|---|
| 2004/0135973 | A1 | 7/2004 | Gustafsson et al. |
| 2005/0156813 | A1 | 7/2005 | Adachi et al. |

FOREIGN PATENT DOCUMENTS

| | | |
|---|---|---|
| EP | 1 059 626 | 12/2000 |
| EP | 1 093 008 | 4/2001 |
| EP | 1 265 097 | 12/2002 |
| GB | 2 405 542 | 3/2005 |
| JP | 62-235929 | 10/1987 |
| JP | 02-262119 | 10/1990 |
| WO | 99/42889 | 8/1988 |
| WO | 91-12554 | 8/1991 |
| WO | 98/10584 | 3/1998 |
| WO | 03/040820 | 5/2003 |
| WO | 2004/001488 | 12/2003 |
| WO | 2004/002143 | 12/2003 |
| WO | 2004/008226 | 1/2004 |

* cited by examiner

Prism film / substrate 81

MULTI-DEPTH DISPLAYS

This Nonprovisional application claims priority under 35 U.S.C. § 119(a) on UK Patent Application No. 0522142.9 filed in the United Kingdom on Oct. 31, 2005, the entire contents of which are hereby incorporated by reference.

FIELD OF THE INVENTION

The invention relates to multi-depth display devices methods.

BACKGROUND OF THE INVENTION

Some vehicles now contain a display in the dashboard to show the instrument cluster rather than more commonplace mechanical dials. One factor that has limited the widespread acceptance of such displays is the realism with which they can represent the instruments. The current invention attempts to address this issue by describing a display that can produce multiple images at different depths using only a single display as an image source. Such a display could show the instrument panel at one depth and the needles and warning indicators floating above it. This would increase both the visibility and realism of the instruments leading to a wider user acceptance.

A display that can produce multiple images at different depths would have many further applications. For instance it could be used for a car navigation display, to allow waypoints or items of interest to float above a background map. It could be used as a personal computer display to add functionality to current operating systems and applications. It could be integrated into a games system to provide limited depth plane 3D. It could be integrated into medical imaging systems to allow the operator to overlay various data sets. In fact many of the applications of current auto-stereoscopic displays would be appropriate for this invention.

The prior art teaches us how to make stereoscopic and auto-stereoscopic displays from a single panel, however, these devices produce a stereo image pair rather than true depth. Drawbacks of auto-stereoscopic displays include: limited head freedom, and eye strain due to conflicting depth cues (convergence—accommodation).

Figure 1:
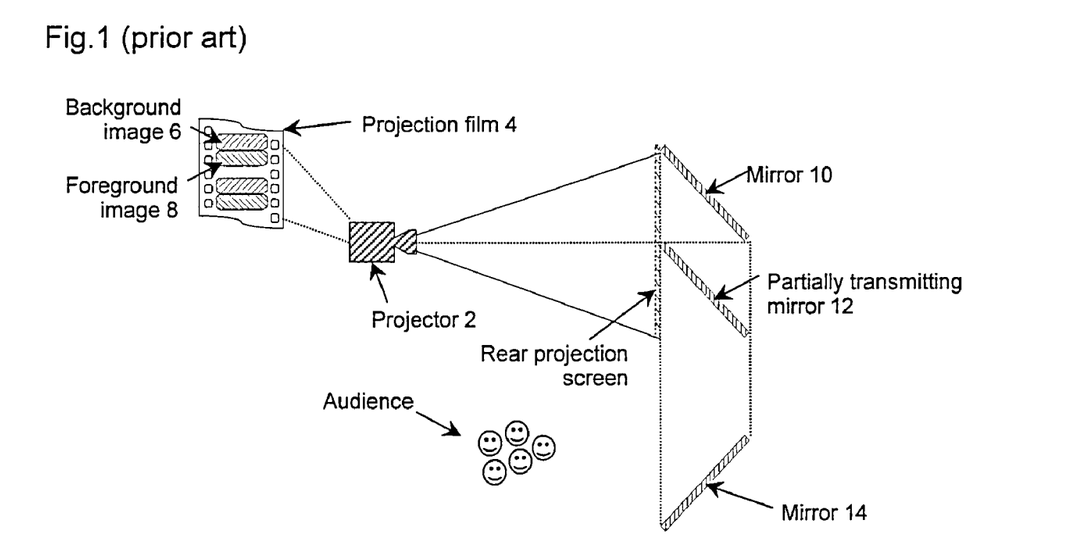
FIG. 1 is an illustration of a prior art arrangement described in U.S. Pat. No. 4,736,214 described above.

U.S. Pat. No. 4,736,214 (Rogers, filed 16 Jul. 1985), illustrated in FIG. 1, describes a film projector 2 which uses film 4 that contains two images for each time frame, a background image 6 and a foreground image 8. The two images are projected via different length optical paths to produce a motion picture with two depth planes. This generates the multiple depth effect but requires large, expensive film apparatus and a bulky series of mirrors 10, 12, 14 to create the path difference.

Figure 2:
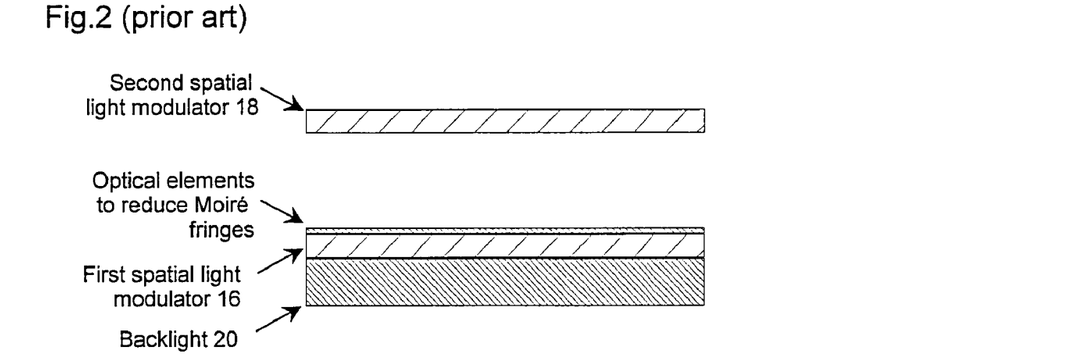
FIG. 2 is an illustration of a prior art arrangement described in WO99/42889 described above.

Various types of volumetric and multi-panel/multi-screen displays have also been described. Deep Video Imaging (WO99/42889, WO03/040820A1, WO2004/001488A1, WO2004/002143A1 and WO2004/008226A1) describe a display, illustrated in FIG. 2, constructed from two spatial light modulators (SLMs) 16 and 18 overlaid in front of a light source 20 to create a single device with two depth planes. This achieves a similar effect to the current invention but with the following drawbacks. Moiré fringes occur due to the same regular pattern of the black mask on both of the panels 16 and 18. The use of multiple panels 16 and 18 leads to a very low light transmission and thus a very bright backlight is needed. The system is subtractive, so a back pixel must be on for a pixel in front to be seen, which means a light object cannot be shown on a dark background. As light must pass through both layers, parallax effects will occur at boundaries. The display uses multiple SLMs which makes the system expensive compared to a standard display. To increase the number of depth planes the number of SLMs must be increased (there is a 1 to 1 correlation between depth planes and SLMs). The system requires synchronised control of multiple display panels.

Application U.S. Pat. No. 2004/0029636A1 describes a similar multiple panel display device, however, it is specifically targeted at a wagering gaming device.

EP1059626A1 and EP0454423A1 describe multilayer displays but with fixed electrode patterns specifically targeted at certain applications such as a watch and hand-held game. EP1265097A2 refers to a display for an automotive instrument cluster consisting of a matrix addressable display overlaid with a patterned display capable of showing specific vehicle functions. Drawbacks are the same as above for multiple panel displays, but in addition they can only show limited images as dictated by electrode patterns.

EP1093008A1, JP02-262119A, WO91/12554A1, JP62-235929A and U.S. Pat. No. 2002/0105516A1 disclose volumetric displays based on multiple layer scattering and polariser free display panels. These are designed to improve the brightness of the resulting image compared to absorbing display panels, but have a number of drawbacks. The dark (no light) state is produced by the no scattering state. In this case the light is transmitted to the environment which would not be suitable for an automotive display, particularly for night time driving. In addition multiple displays make the system expensive. These types of display also have slow switching times and are not suitable for the wide temperature ranges of the automotive environment.

Figure 3:
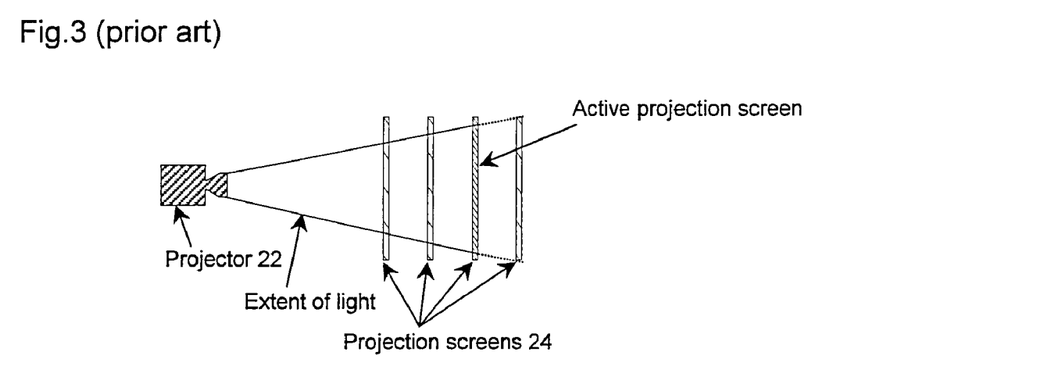
FIG. 3 illustrates a prior art arrangement described in U.S. Pat. No. 2002/0163482A1 described above.

U.S. Pat. No. 4,333,715, U.S. Pat. No. 2002/0163482A1 (scattering) and U.S. Pat. No. 4,670,744 (reflection) disclose time sequential projection volumetric displays, illustrated in FIG. 3. These operate using a projector 22 to display the images for each plane sequentially in a single display frame. The reflective or scattering panels 24 are then switched on in synchronisation with the images. There are a number of disadvantages. Time sequential projection requires the device to operate faster than video rate, which is difficult with current technologies over a wide temperature range. Also, synchronisation with shutters is required, and the system is bulky due to projection optics.

DaimlerChrysler F500 Mind Car research vehicle shown at the 2003 Tokyo motor show (and described at http://www-.daimlerchrysler.com/dccom/0-5-7154-1-150005-1-0-0-149730-0-0-8-7145-0-0-0-0-0-0-0.html) demonstrated an instrument cluster which overlaid, by means of a half-silvered mirror, a standard cluster and an LCD panel. However, this requires extra volume as two displays must be at an angle to each other, and the multiple displays make the system expensive.

Figure 4:
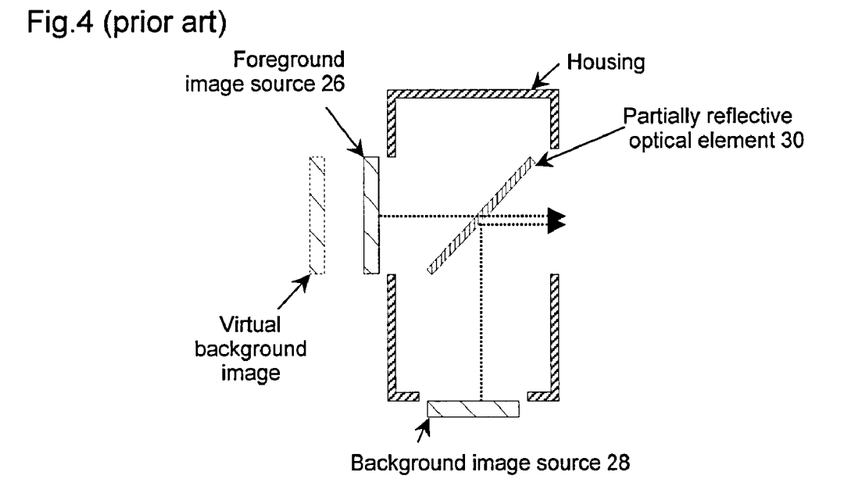
FIGS. 4 to 6 show prior art arrangements described in WO98/10584 described above.
Figure 5:
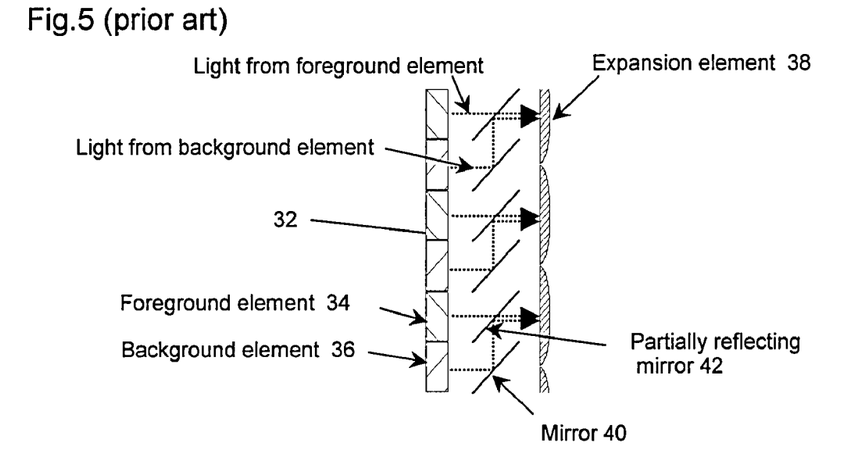

WO98/10584A2, illustrated in FIG. 4, describes a device using multiple display devices 26 and 28 and a partially silvered mirror 30 to produce two image planes at different depths. This embodiment is bulky and costly due to using two displays. In a separate embodiment, the device produces two images derived from large regions of the same display device, as illustrated in FIG. 5. FIG. 5 shows a display device 32 divided into foreground elements 34 and background elements 36. Light from the foreground elements 34 passes directly to expansion elements 38, whereas light from the background elements 36 is reflected first by mirrors 40 and then by partially reflecting mirrors 42 before reaching the expansion elements 38. The background image, formed from the background elements 36, therefore appears to the viewer to be further away than the foreground image which is formed from the foreground elements 34. As the elements 34 and 36 are large, additional elements 38 are required to expand the sections of the image to fill the entire display region. These extra elements 38 lead to a reduced head freedom due to the f-number of the lenses, and the additional elements require exact alignment with the regions of the display. Two mirror elements 40, 42 are required per section which is both bulky and costly. Any aberration in the lenses would cause image distortion as the viewer moves relative to the display even if it is perfectly compensated on axis.

Figure 6:
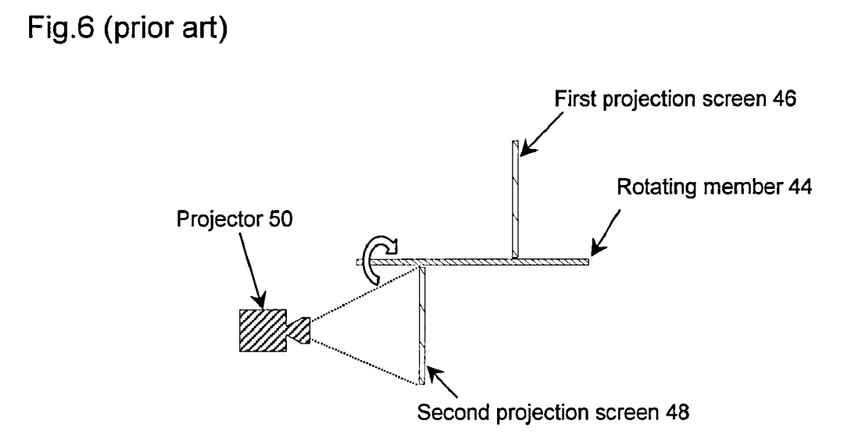

WO98/10584A2 also describes a third configuration, illustrated in FIG. 6, which is a time sequential method in which a rod 44 with mirrors, lenses or projections screens 46, 48 attached is rotated in synchronisation with images displayed by a projector 50. The items attached to the rod 44 are at different distances from the display device so that the observer sees two different depth images. The device requires a bulky projector 50 and spinning rod 44, and rotation of the rod 44 must be synchronised with the projected images.

SUMMARY OF THE INVENTION

The invention seeks to provide an improved multi-depth display apparatus for displaying images at at least two different perceived depths, using a single display.

The invention provides a multi-depth display apparatus and a method of producing at least one multi-depth image as set out in the accompanying claims.

A multi-depth display apparatus of the present invention for displaying images at at least two different perceived depths comprises a display panel comprising a plurality of pixels arranged to display at least a first image and a second image; and a direction changing layer arranged so that light forming said first and second images enters the direction changing layer and then exits the direction changing layer, wherein: in relation to the light forming said first image, the direction of the light is changed by the direction changing layer so that the light exiting the direction changing layer is changed in direction by a first angle relative to the light entering the direction changing layer; and in relation to the light forming said second image, the direction of the light is changed by the direction changing layer so that the light exiting the direction changing layer is changed in direction by a second angle relative to the light entering the direction changing layer; and wherein said first and second angles are different; so as to create a difference in perceived depth between said first and second images when viewed by a user.

A method of the present invention of producing at least one multi-depth image uses the display apparatus of the present invention, the method comprising at least the steps of: a) using said display panel to display a first image in a first range of directions and a second image in a second range of directions, and b) adjusting the direction of the light forming said first image by a first angle, and adjusting the direction of the light forming said second image by a second angle.

BRIEF DESCRIPTION OF THE DRAWINGS

Embodiments of the invention will now be described, by way of example only, with reference to the accompanying drawings, in which.

DESCRIPTION OF THE EMBODIMENTS

Figure 7:
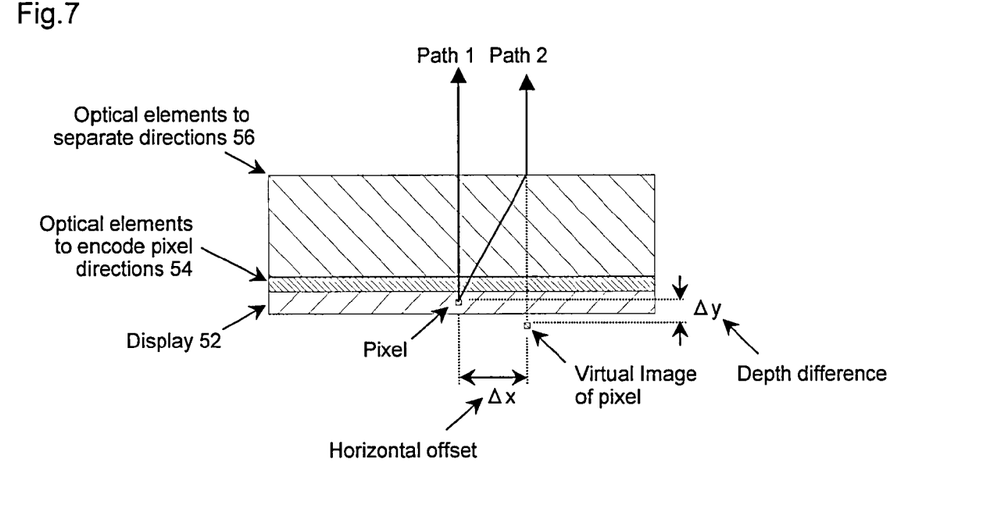
FIG. 7 shows the basic concept of embodiments of the invention described herein.

FIG. 7 shows the general concept of a single display 52 that can produce multiple images multiplexed in either angle, polarisation, time or wavelength followed by optics 54, 56 which cause the multiplexed images to take different optical paths to the user, such that they are observed to overlap at different depths. There are a number of ways the optical paths can be altered depending on the method of multiplexing; for example using a birefringent material, or by diffractive, refractive or mirrored elements.

Figure 8:
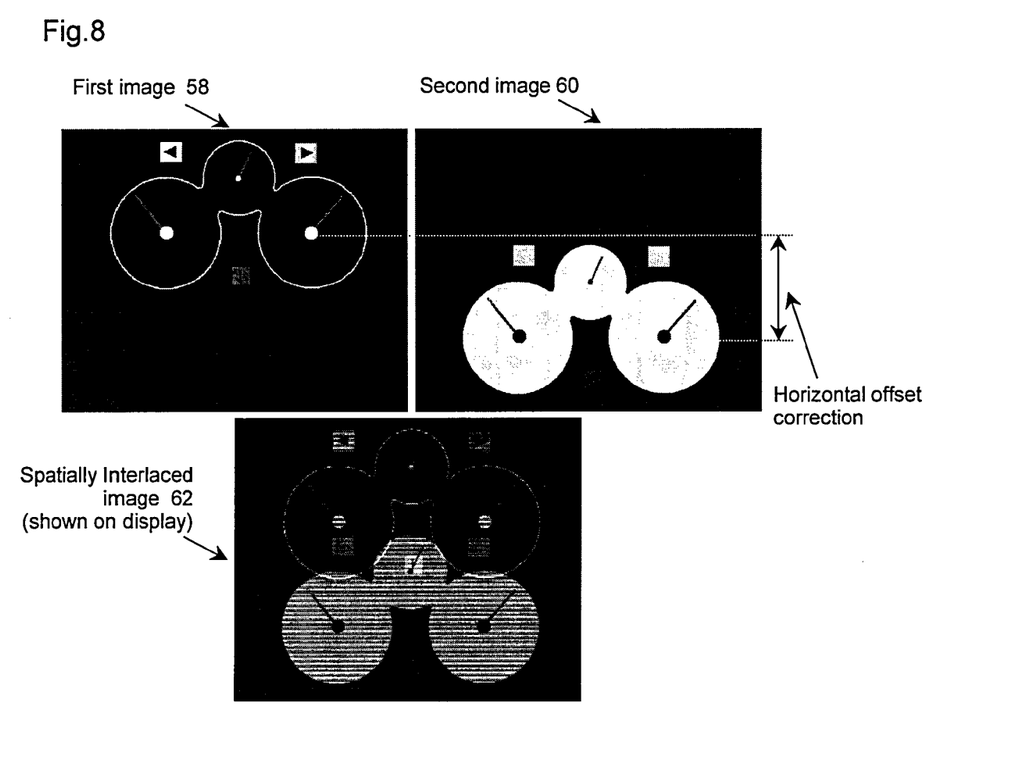
FIG. 8 shows the construction of a typical image to be shown on a display in an automotive application.

Multiplexed images are then shown on the display corresponding to the multiple planes of the required output. FIG. 8 shows an example pair of images 58, 60 for an automotive application and the corresponding interlaced image 62 that could be shown on a spatially multiplexed display.

Figure 9:
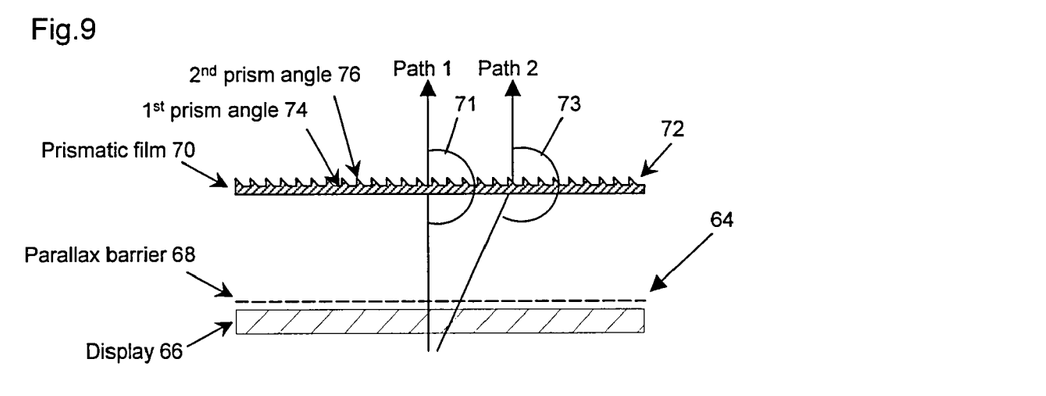
FIG. 9 shows an embodiment using a prismatic film.

A first embodiment is shown in FIG. 9. It consists of a multi-view display 64; that is, a display that can produce independent images multiplexed in angle. This could be, for example, a display (display panel) 66 with an absorbing barrier 68 over the pixels arranged such that when viewing the display off axis some of the pixels are obscured. This barrier 68 may take one of many forms as is known in the art, for instance it may obscure every other sub-pixel or every other pixel. A suitable parallax barrier 68 is described, for example, in GB 2,405,542. Note that there are other methods for creating a multi-view display, such as using a lenticular array instead of the barrier 68, using a directional backlight or using the inherent properties of the display. These methods are known to those skilled in the art and as such are not covered in this disclosure. As is also known in the art this type of display is not limited to just two images or views.

At a distance from the surface of the display 66 is placed a prismatic film 70 consisting of repeating sections of prism elements 72. The number of elements in each repeating section is equal to the number of distinct depth planes. Each repeating section 72 has first and second surface angles 74 and 76 designed such that the light from the corresponding depth plane image is refracted towards the viewer, such that when the viewer is in the correct viewing region they can see the images from all of the views simultaneously overlaid at different depths. Note that the number of prism faces 74, 76 is not necessarily equal to the number of views produced by the display, as it is possible to use one prism face to refract more than one image, as will be described below.

FIG. 9 shows the situation in which the display 66 produces two views, one normal to the display 66 and one at an angle of approximately 30 degrees, which is for example only and in no way limits this application.

It should be understood that the display panel 66 may produce more than two views. Also, any distance can be used between the display 66 and the prismatic film 70. Increasing the distance increases the depth between the planes perceived by the viewer. The prismatic film 70 may be larger than the display 66 to provide for a large head freedom, but this is not necessary. The display 66 need not necessarily be parallel with the prismatic film 70. The pitch of the repeating sections of the prismatic film 70 should be small to avoid being visible by viewers. The prismatic film 70 is shown in FIG. 9 as being flat/plane in one section, but this need not necessarily be the case, and the prismatic film 70 may have prism angles in both sections. In addition, although FIG. 9 shows one of the paths (path 1) as being normal to both the display 66 and the prismatic film 70, this need not necessarily be the case. To produce different depths it is only necessary that the paths (paths 1 and 2 in FIG. 9) are different. FIG. 9 also shows an example in which the viewer is on-axis, i.e. path 1 and path 2 leave the prismatic film 70 at 90° to the prismatic film 70. However, the display could be configured so that the normal viewing position is at any angle to the display 66 and prismatic 70. The pixels of the display 66 need not alternate regularly between the two or more views, and any pattern of interlacing could be adopted.

In FIG. 9 Path 1 (corresponding to the first view) exits the prismatic film 70 at an angle 71 relative to its angle of entry, and Path 2 (corresponding to the second view) exits the prismatic film 70 at an angle 73 relative to its angle of entry. Angle 71 is 180 degrees, whereas angle 73 is greater than 180 degrees. The prismatic film 70 acts as a "direction changing layer" which may change the angles of Paths 1 and 2 by first and second angles respectively. In FIG. 9 the first angle is zero (ie Path 1 is unchanged in direction) and the second angle is about 30 degrees. However, in other embodiments both Paths 1 and 2 may be changed by the direction changing layer.

Figure 10A:
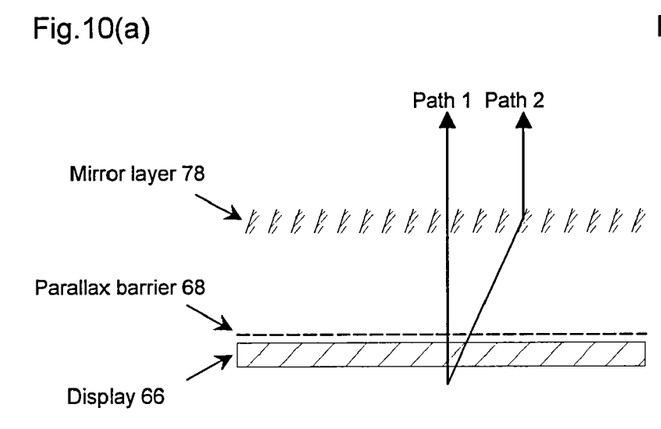
FIG. 10*a* shows an embodiment using a mirror layer.

A further embodiment is shown in FIG. 10a. It consists of a multi-view display in which corresponding components have the same reference numerals as in the previous embodiment, but uses a layer of mirror elements 78 instead of a prism array, as a direction changing layer. The mirrored elements 78 are arranged to have a similar effect as the prism elements, that is, to reflect the light from each of the views towards the user. The figure shows only a single mirror angle as the second view is normal to the display 66 and can thus pass between the mirror elements 78 to the user. However it is possible to have multiple angled mirrors if more views are required. It should be noted that the repeat frequency of the mirrors should be higher than the repeat frequency of the pixels in the display 66, otherwise the sections of the display visible in each mirror will appear reversed. It should also be noted that the light reflected by the mirrors is brought to a one-dimensional focus above the direction changing layer.

That is, the light is focussed in the plane perpendicular to the plane of the mirrors, but not in the plane parallel to the mirrors, in much the same way as light is focussed by a cylindrical lens or mirror. Thus, if the user places their eyes perpendicular to the plane of the mirrors, they will observe the second image to be above the display, however if they place there eyes parallel to the mirrors it will appear below.

The mirrors may take any angle to the vertical, the larger the angle, the more aberrated the image will appear. A special case occurs when the mirrors are vertical, in which case the image is no longer aberrated and is formed in an equal position to the original object, but on the opposite side of the direction changing layer. Thus providing a depth difference of twice the separation between the direction changing layer and the display. It should be realised that in this situation the secondary image cannot be viewed on-axis as the mirrors will be parallel to the user and thus present no reflective surface.

The mirror layer 78 of FIG. 10a can be formed by embedding reflective metal or dielectric film elements in a polymer. A prism film substrate is first made by embossing or moulding a plastic film. A reflective metal (for example, aluminium, silver or chromium) or a multiple-layer dielectric film is deposited by evaporation from a source positioned in a vacuum chamber so that the faces on only one side of the prism elements are coated. The structure is then coated with a curable polymer resin whose refractive index matches the substrate, and a flat polymer sheet is placed on top to ensure optical flatness. The resin is cured. All transparent parts of the structure are optically matched (have the same index) so that the boundaries between them are not visible and the result is a mirror array embedded in polymer, which can be used as the mirror layer 78 of FIG. 10a.

Figure 10B:
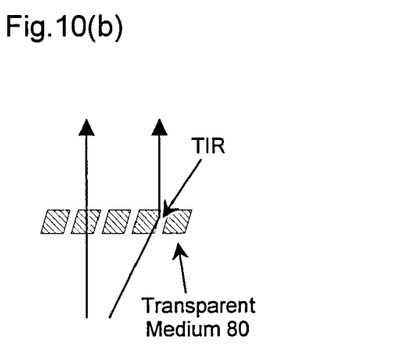
FIG. 10*b* shows an embodiment using a Total Internal Reflection (TIR) layer.

As shown in FIG. 10b, the mirrored elements 78 may be replaced by a transparent medium 80 in which Total Internal Reflection (TIR) can occur, which has the same effect of reflecting the light towards the user.

Figure 21:
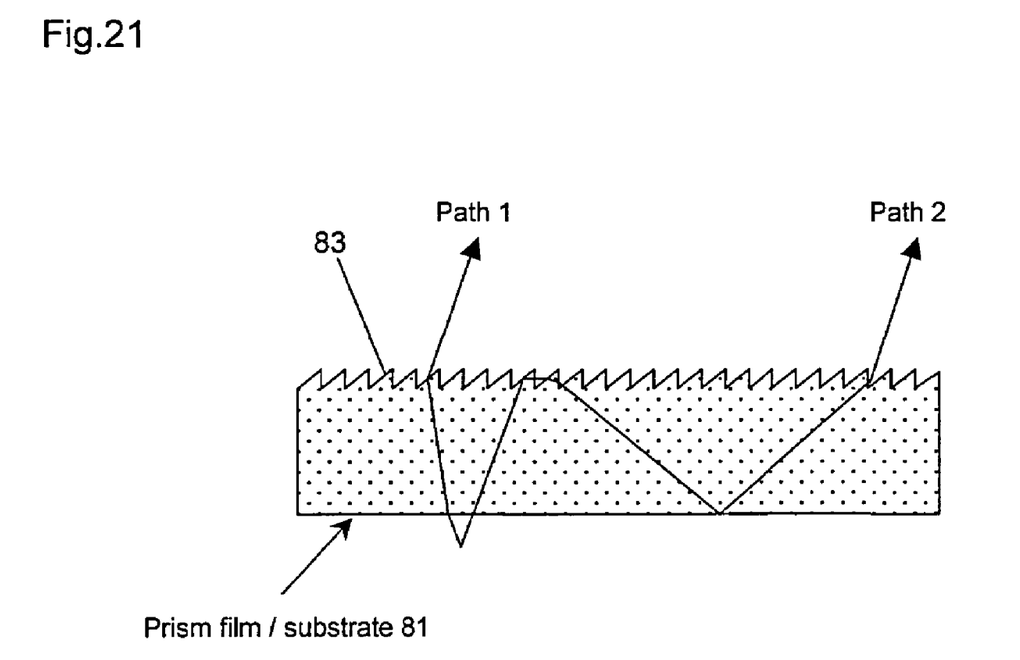
FIG. 21 shows how large differences in optical path length can be achieved by waveguiding within a substrate.

The optical path difference which causes the depth difference can be more complex than just a single bend/deviation. FIG. 21 shows how large differences in optical path length can be achieved by waveguiding within a substrate 81. Light entering the substrate/prism film 81 along path 1 is refracted at the upper surface and travels toward the user. Whereas light travelling along path 2 is totally internally reflected at the upper surface and waveguides down the substrate 81 before exiting, when it refracts from the upper surface towards the user. This method produces a much greater depth difference between the two planes than the simple refraction methods. In this embodiment the actual prisms 83 at the top of the substrate 81 can be regarded as a direction changing layer, separate from the body of the substrate 81 within which a path difference arises. The prism film/substrate 83 illustrated in FIG. 21 can be used instead of the mirror layer 78 illustrated in FIG. 10a.

Manufacturing methods for prism films of the type shown in FIG. 21 are well known. A number of companies around the world produce such films, including 3M (St. Paul, Minn.: products sold under the trade name 'Vikuiti'), Fresnel Optics (Rochester, N.Y.). U.S. Pat. No. 6,560,026 (Gardiner, filed Jan. 16, 2002) gives some details of manufacturing methods for such films.

As well as causing a change in depth, the deviation in optical path can also cause an undesirable translation in the image. This can be corrected by altering the image displayed, as is shown in FIG. 8. However, this leads to an area at the top and bottom (or left and right) of each image which contains only one depth plane.

Figure 11:
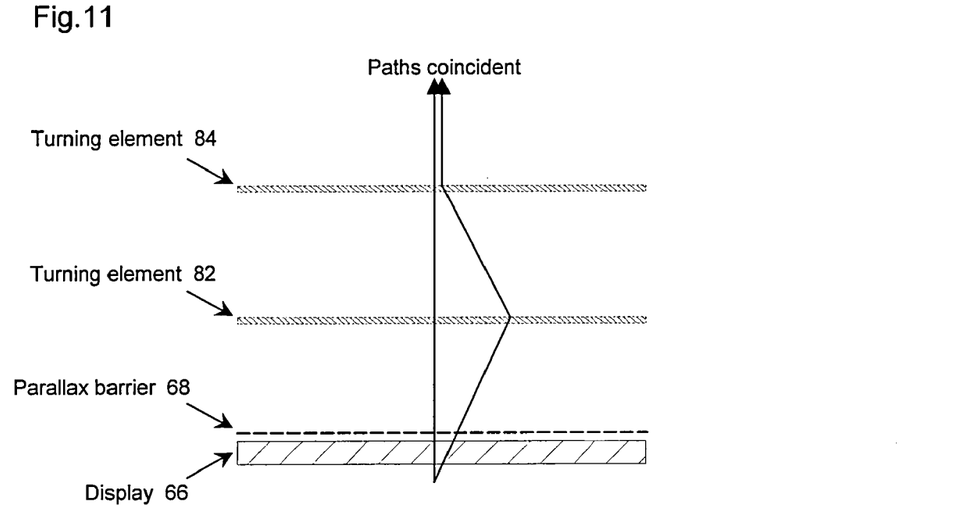
FIG. 11 shows an arrangement for removing horizontal offset.

An alternative to image correction is to compensate the path of the light. FIG. 11 shows an illustration of how this can be achieved. Two turning elements (direction changing layers) 82, 84 are used, such that their combined effect is to return the light paths to being approximately coincident. This removes the offset while retaining the depth difference between the images. The turning elements 82, 84 can be any of the direction changing layers of the other embodiments, for example the prismatic film of FIG. 9 or the mirror layer of FIG. 10.

The path change can also lead to a second undesirable effect; the refractions that occur in the prism film 70 can lead to a colour splitting in the final image. This can be corrected by a number of methods. If the white light source consists of 3 monochromatic or narrow band sources then the displayed image may be corrected by offsetting the individual colours. If however a broadband light source is used, then the aberration may be corrected by forming an achromatic doublet at the prism layer as is known to those skilled in the art of lens design.

Figure 12:
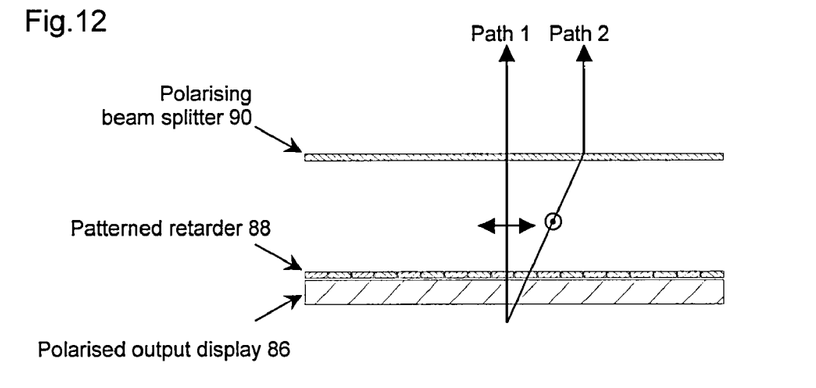
FIG. 12 shows an embodiment using a patterned retarder and a polarising beam splitter.

The different images may be distinguished and multiplexed using polarisation. FIG. 12 shows an example of this method. The polarisation of every other pixel can be rotated such that alternative pixels have orthogonal polarisations. This encoding can be achieved by a number of methods, but care must be taken to avoid parallax effects due to the distance between the pixels and the polarisation encoding elements. One method for avoiding this parallax is using a Liquid Crystal Display (LCD) 86 with an in-cell polariser and in-cell patterned retarder 88 to encode the polarisations. Alternatively a collimated backlight can be used, then the polariser and patterned retarder can be placed on the outside of the cell structure. As a further alternative an emissive non-polarised display such as OLED display can be used with a patterned polarising layer on the pixel surface.

Figure 13:
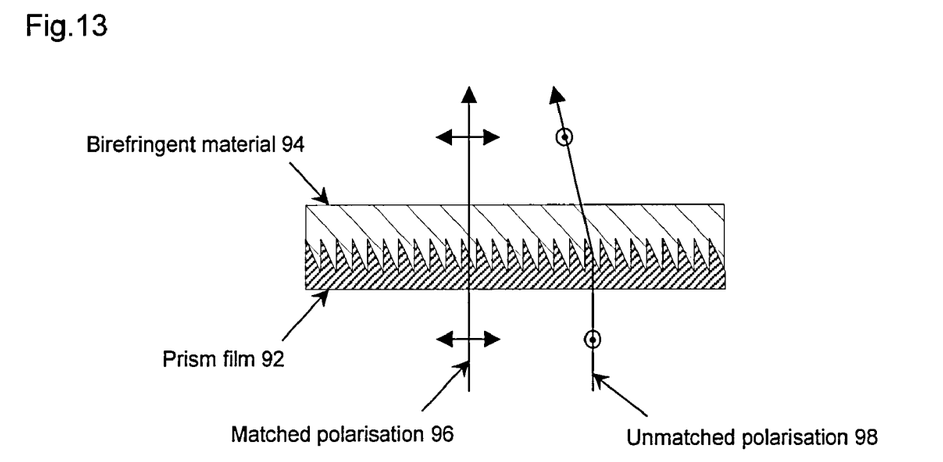
FIG. 13 shows an embodiment using a birefringent material as a polarising beam splitter.

To separate the polarisation encoded images, an element (direction changing layer) 90 with a refractive power dependent on polarisation may be used. An example of this, shown in FIG. 13, is a single angle prism film 92 such as is commonly known as a Fresnel prism with a birefringent material 94 filling the prism surface. The birefringent material is selected such that one refractive index matches that of the material of the Fresnel prism. In this way, one polarisation 96 does not see a refractive index contrast at the prism surface and therefore exits at the same angle, while the other polarisation 98 sees a contrast and is refracted.

Figure 14:
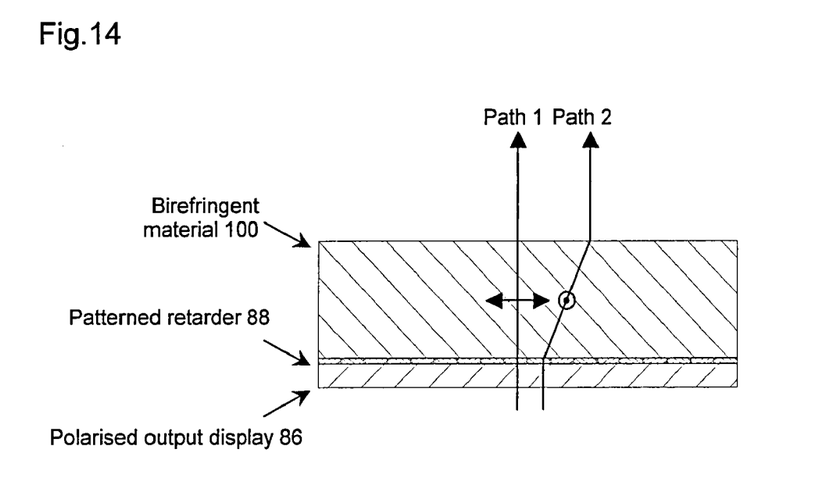
FIG. 14 shows an embodiment using a birefringent material and a patterned retarder.

Another method for separating the images, shown in FIG. 14, is by using a volume of birefringent material 100 placed above the polarisation encoded display 86, 88. The optical axis is arranged such that the light experiences double refraction and the path of one image is deviated while the other remains normal to the display.

Figure 14A:
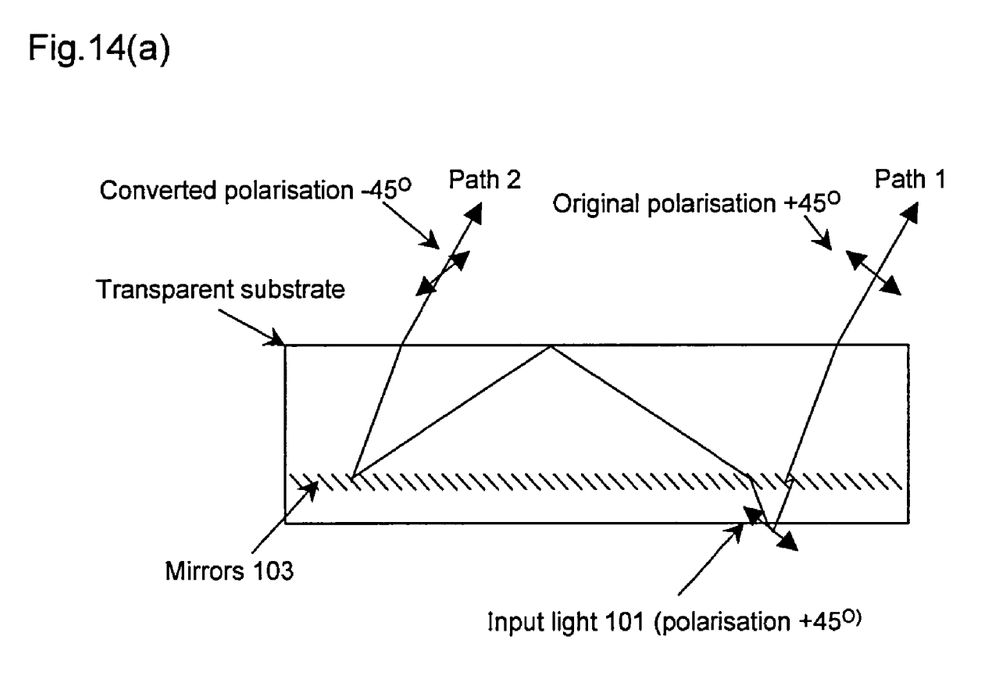
FIG. 14*a* shows a method of separating images of different polarisation using a mirror layer.

Another method for separating polarisation encoded images, shown in FIG. 14a, uses the rotation of the plane of polarisation of light on reflection. The figure shows input light 101 from a pixel with an input polarisation at 45 degrees to the plane of a mirror layer comprising a plurality of mirrors 103. When the light is reflected from the mirrors its polarisation is rotated by approximately 90 degrees. Therefore, a path that takes an even number of reflections (path 1) will retain the same polarisation as at the input, whereas a path that takes an odd number of reflections (path 2) will have its plane of polarisation rotated by approximately 90 degrees. By placing a linear polariser at the top of the substrate, one of the polarisations can be blocked and the pixel can be made to appear in either the upper or lower plane. If a fixed polariser is used and the output polarisation of every other pixel is rotated by approximately 90 degrees, then each pair of pixels will appear in different depth planes and a spatially interlaced display may be used. In this embodiment, the mirror layer 103 can be regarded as a direction changing layer, separate from the transparent substrate.

Polarisation encoding can be further extended to a system in which the depth of each pixel can actively be changed. If instead of using a patterned retarder, a liquid crystal cell is used then the output polarisation of each pixel can be set. Again a polarising beam splitter can be used to separate the two polarisations (or any other method). Such a system has the advantage that no resolution is being lost due to having equal numbers of pixels on multiple depth planes. Note that as the depth of each pixel can be changed individually, the horizontal offset cannot be corrected in software, instead a hardware correction must be applied equivalent to that shown in FIG. 11. Also parallax problems must be considered due to the distance between the display and the polarisation encoding elements. It should be realised that although this design uses two polarisation-rotating cells it does not contain twice the number of absorbing elements, so does not suffer from the same drawbacks as many of the prior art two panel solutions.

Figure 15:
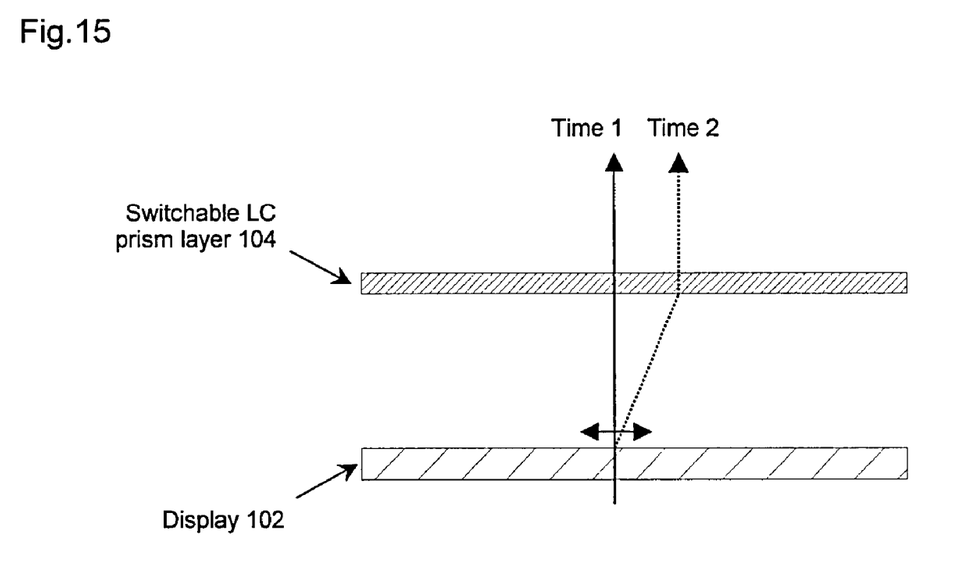
FIG. 15 shows an embodiment using a switchable liquid crystal prism layer.
Figure 16:
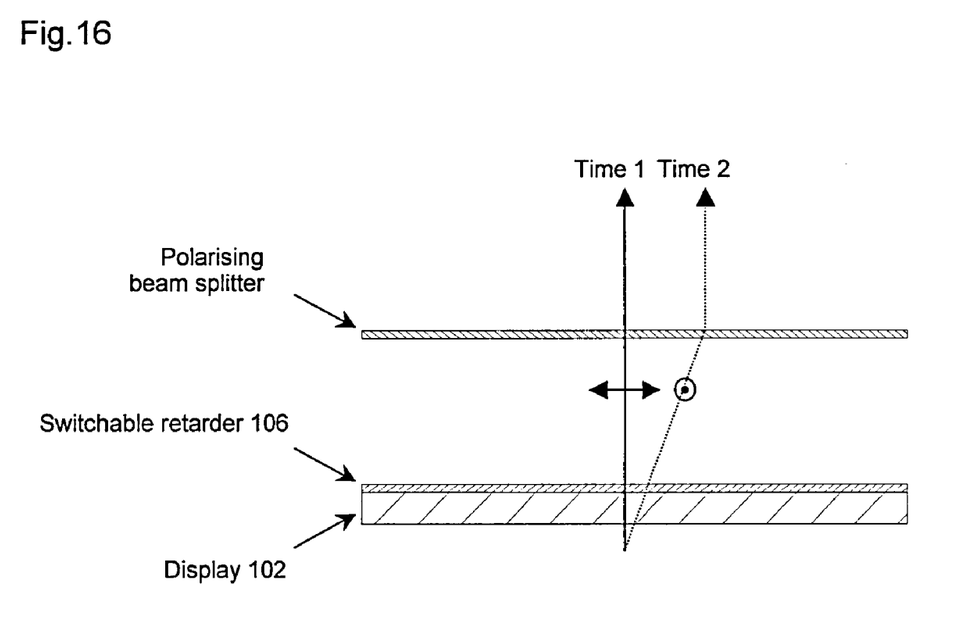
FIG. 16 shows an embodiment using a switchable retarder.

It is possible to encode the images temporally, that is, to display the images time sequentially and switch another element in synchronisation to deviate the paths. An example of this is shown in FIG. 15. In this embodiment the images are shown by a display 102 sequentially and a LC prism layer (direction changing layer) 104 is switched on and off in synchronisation. When switched off the LC layer 104 has no effect on the path of the light, but when it is switched on it deviates the path, causing the image to appear at a different depth. As shown in FIG. 16, an alternative is to instead rotate the polarisation of the light for the sequential images displayed by the display 102, for example using a switchable retarder 106, and have a fixed prism structure matched to an LC layer.

Figure 17:
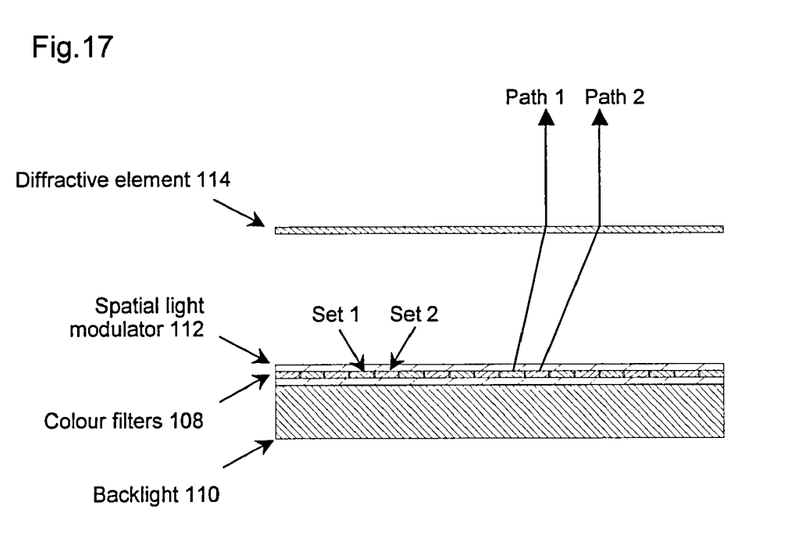
FIG. 17 shows an embodiment using colour filters to allow the two images to be distinguished on the basis of wavelength.

A further embodiment uses wavelength multiplexing. That is, the images use slightly different wavelengths so that they can be discriminated. FIG. 17 shows an example of this in which narrow band colour filters 108 are used in an LC display having a backlight 110 and SLM 112. The colour filters 108 are designed such that alternate pixels (corresponding to different images) have slightly different red, green and blue pass bands. In this way alternate pixels may be distinguished by their wavelengths. This is achieved by using a diffractive or holographic element (direction changing layer) 114 that changes the path of the light dependent on the wavelength.

Figure 18:
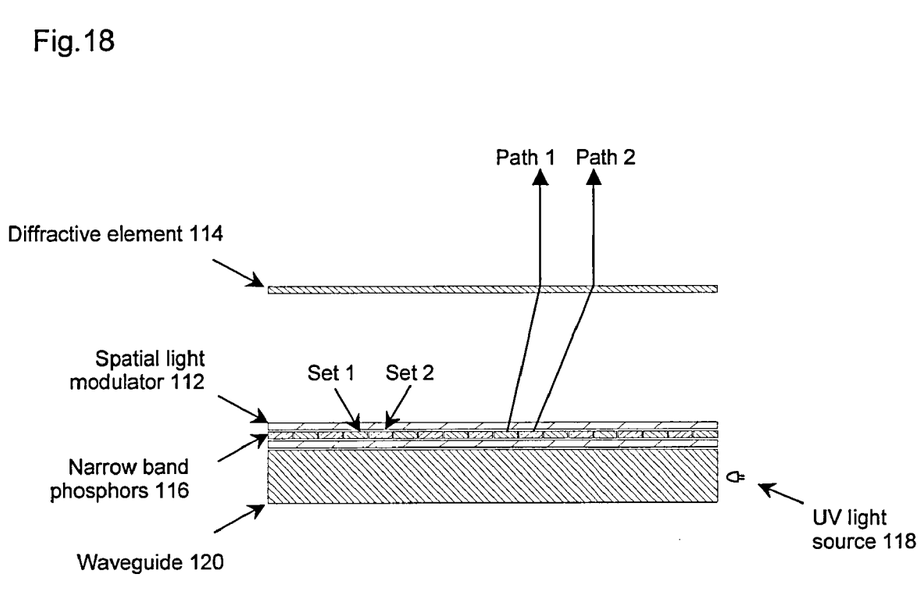
FIG. 18 shows an embodiment using narrow band phosphors.

FIG. 18 shows a further wavelength multiplexed embodiment similar to the previous embodiment, but where the different wavelength pixels are produced by narrow band phosphors 116 illuminated by a UV light source 118 and waveguide 120.

Figure 19:
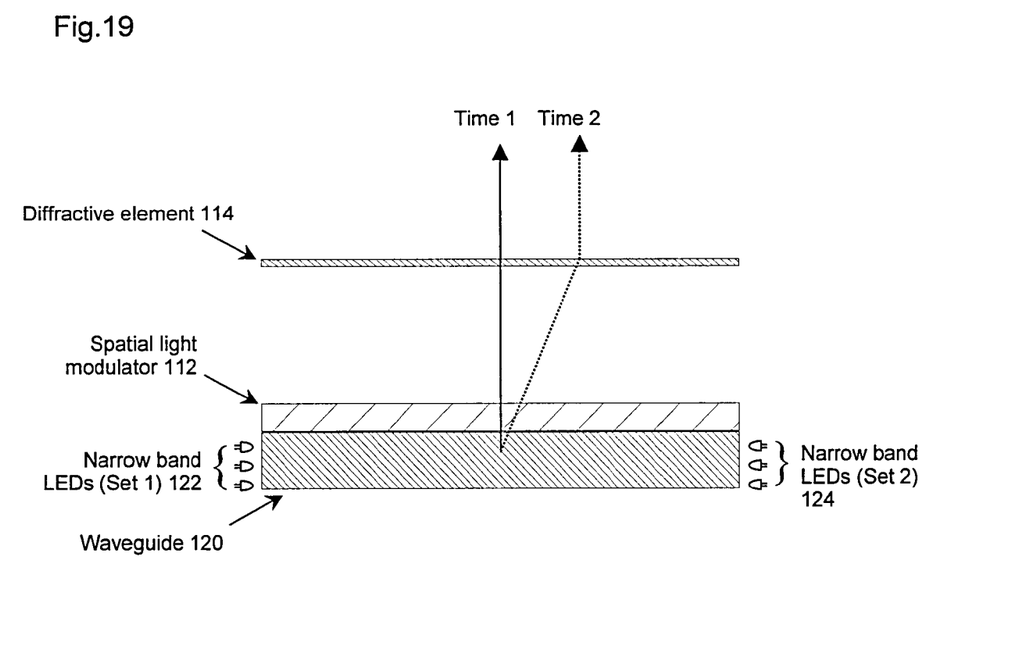
FIG. 19 shows an embodiment using narrow band LEDs.

It is also possible to combine the multiplexing methods as is illustrated in FIG. 19, which shows a combined time and wavelength multiplexed method. Two narrow band light sources 122, 124 at slightly different wavelengths are alternately switched on and the entire image is shown on the display. Again a diffractive element 114 is used to separate and vary the depth of the images.

Figure 20:
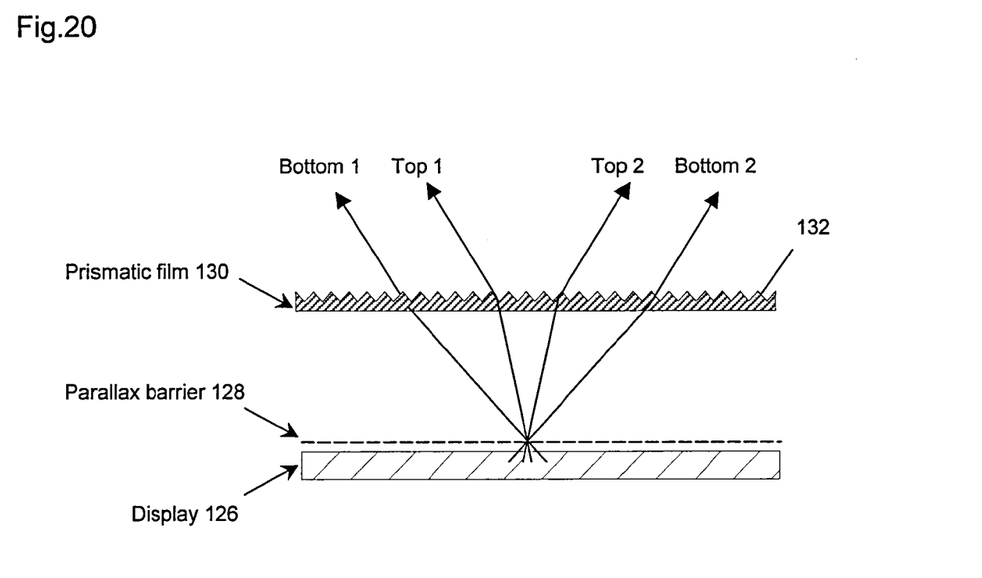
FIG. 20 shows an embodiment which produces two dual depth images.

FIG. 20 shows how the embodiment of FIG. 9 can be adapted to produce a display that can show two independent dual-depth images to two users. The embodiment of FIG. 20 uses a display 126 and parallax barrier 128 which are capable of displaying four different images at four different angles. A prismatic film (direction changing layer) 130 is positioned above the display 126, and comprises a number of repeating sections of prism elements 132. Each repeating section 132 has only two upper surfaces, each of which performs two functions. One surface produces the top image for one viewer and the bottom image for the other, and the other surface produces the bottom image for the one viewer and the top image for the other. Such a device could be used for example for a table-top game.

It should be understood that the features of the different embodiments described above could be combined in any combination. For example, if two or more direction adjustment layers are used these need not be of the same type. For example, the first direction adjustment layer could be a mirror layer and the second adjustment layer could be a prismatic film. Alternatively, the first layer could be a polarising beam splitter and the second layer a mirror layer, and so on. Any combination is possible. There may of course be more than two direction adjustment layers, and the display may display simultaneously any number of images each having any number of depth planes. In addition, although this description refers to depth planes, it should be understood that the images at different depths could take any shape, and need not be planar. Curved images are possible, as are images of any other shape.

If a prismatic film is used, the number of prism faces in each repeating section does not necessarily have to equal the number of depth planes. For example, FIG. 20 shows an embodiment in which one prism face is used to form two images. A polarised output display can be an emissive display (e.g. OLED, PDP) plus a polariser, or a polarised display such as an Active Matrix LCD (AMLCD).

The embodiments described above provide a number of advantages. The embodiments use a single display which makes them cheaper than multiple display solutions. The embodiments do not rely on stereoscopic pairs of images, and therefore avoid the associated eye-strain. In addition, there is wide viewing freedom because unlike auto-stereoscopic displays this system does not produce viewing windows. The embodiments are also additive, so a light object can appear in front of a dark background, whereas the multi-layer methods of the prior art are subtractive, so light objects cannot appear in front of dark backgrounds. This also leads to a reduced Moire effect compared to subtractive systems. A further advantage is that light not used in the images is absorbed by the display panel rather than being transmitted into the environment.

The embodiments described above do not rely on moving parts, and no alignment is required between the display panel and the additional optical elements. If a spatial light modulator (SLM) is used as the display device light only passes through a single SLM plus optical elements, so the resulting image is brighter than is the case in multiple SLM solutions. One display can also create more than two depth planes, as mentioned above.

It will be appreciated that one of the ways in which the embodiments described herein differ from the prior art shown in FIG. 5 is that, in FIG. 5 the path difference between the two images arises entirely within the mirror layer 40, whereas in the embodiments described herein path difference arise outside of the various different direction changing layers, such as the prismatic film 70, mirror layer 78, turning elements 82 and 84, polarising beam splitter 90 and the like. It should also be noted that the foreground and background elements 34 and 36 in FIG. 5 are large, and FIG. 5 shows substantially the whole panel. Whereas the embodiments described herein use a direction changing layer with elements of preferably less than 1 mm in at least one dimension.

As described, the multi-depth display apparatus for displaying images at at least two different perceived depths, comprises:

a display panel (66) comprising a plurality of pixels arranged to display at least a first image and a second image; and a direction changing layer (70, 78, 82, 84, 90, 103, 104, 114, 130, 83) arranged so that light forming said first and second images enters the direction changing layer and then exits the direction changing layer, wherein:

in relation to the light forming said first image, the direction of the light is changed by the direction changing layer (70, 78, 82, 84, 90, 103, 104, 114, 130, 83) so that the light exiting the direction changing layer is changed in direction by a first angle relative to the light entering the direction changing layer; and in relation to the light forming said second image, the direction of the light is changed by the direction changing layer (70, 78, 82, 84, 90, 103, 104, 114, 130, 83) so that the light exiting the direction changing layer is changed in direction by a second angle relative to the light entering the direction changing layer;

and wherein said first and second angles are different;

so as to create a difference in perceived depth between said first and second images when viewed by a user.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A multi-depth display apparatus for displaying images at at least two different perceived depths, the display apparatus comprising a display panel comprising a plurality of pixels arranged to display at least a first image in a first range of directions and a second image in a second range of directions; and a direction changing layer arranged so that light forming said first and second images enters the direction changing layer and then exits the direction changing layer, wherein:

in relation to the light forming said first image, the direction of the light is changed by the direction changing layer so that the light exiting the direction changing layer is changed in direction by a first angle relative to the light entering the direction changing layer; and in relation to the light forming said second image, the direction of the light is changed by the direction changing layer so that the light exiting the direction changing layer is changed in direction by a second angle relative to the light entering the direction changing layer;

and wherein said first and second angles are different;

so as to create a difference in perceived depth between said first and second images when viewed by a user.

2. A display apparatus as claimed in claim 1, wherein light forming said first image travels along a first path from said display panel to said user, and light forming said second image travels along a second path from said display panel to said user, and wherein the portions of said first and second paths which lie outside of said direction changing layer are different in length, thus creating a path difference between said first and second paths which creates said difference in perceived depth between the first and second images.

3. A display apparatus as claimed in claim 2, wherein said path difference arises, at least in part, between said display panel and said direction changing layer.

4. A display apparatus as claimed in claim 2, wherein said path difference arises, at least in part, on the opposite side of the direction changing layer to said display panel.

5. A display apparatus as claimed in claim 1, wherein said first angle is zero, so that the direction changing layer does not adjust the direction of the light forming said first image.

6. A display apparatus as claimed in claim 1, wherein after passing through said direction changing layer, the light forming said first image is substantially parallel with the light forming said second image.

7. A display apparatus as claimed in claim 1, which further comprises a second direction changing layer arranged to adjust the direction of the light forming said first image by a third angle, and to adjust the direction of the light forming said second image by a fourth angle, wherein said third and fourth angles are different.

8. A display apparatus as claimed in claim 7, wherein either said third angle or said fourth angle is zero.

9. A display apparatus as claimed in claim 7, wherein after passing through both said direction changing layer and said second direction changing layer, the light forming said first image is substantially parallel with the light forming said second image.

10. A display apparatus as claimed in claim 1, wherein the pixels of the display panel represent the fundamental building blocks of said first and second images.

11. A display apparatus as claimed in claim 1, wherein the pixels representing the first and second images are interlaced, so that each pixel of the first image is adjacent to at least one pixel of the second image.

12. A display apparatus as claimed in claim 1, wherein said direction changing layer comprises a prismatic film comprising a repeating pattern of prism elements.

13. A display apparatus as claimed in claim 12, wherein said repeating pattern of prism elements is formed from a plurality of repeating units, with each unit comprising a number of prism elements equal to the number of depths to be displayed by the display apparatus.

14. A display apparatus as claimed in claim 12, wherein said prismatic film is integrally formed with a substrate which is arranged so that total internal reflection within the substrate increases the path difference between light forming said first and second images.

15. A display apparatus as claimed in claim 1, wherein said direction changing layer comprises a mirror layer comprising a plurality of mirror elements.

16. A display apparatus as claimed in claim 15, wherein the spacing between said mirror elements is less than the spacing between adjacent pixels of the display panel.

17. A display apparatus as claimed in claim 15, which comprises a polariser and further reflecting surfaces arranged so that light forming said first and second images may undergo an odd or even number of reflections from both said mirror elements and said further reflecting surfaces before reaching the polariser, and wherein the display panel is arranged to display said first and second images with different polarisations.

18. A display apparatus as claimed in claim 17, wherein the mirror layer is formed within a transparent substrate.

19. A display apparatus as claimed in claim 1, wherein said direction changing layer comprises a total internal reflection layer comprising a plurality of transparent elements within which total internal reflection can occur.

20. A display apparatus as claimed in claim 1, wherein said display panel further comprises polarisation means which ensures that light from pixels representing said first image has a first polarisation and light from pixels representing said second image has a second polarisation which is different from said first polarisation.

21. A display apparatus as claimed in claim 20, wherein said first and second polarisations are orthogonal.

22. A display apparatus as claimed in claim 20, wherein said direction changing layer comprises an element having a refractive power dependent on polarisation.

23. A display apparatus as claimed in claim 20, which further comprises a layer of birefringent material above the display panel, which causes said first image to be displayed in a first range of directions and said second image to be displayed in a second range of directions.

24. A display apparatus as claimed in claim 20, wherein said polarisation means comprises a patterned retarder.

25. A display apparatus as claimed in claim 20, wherein said polarisation means comprises a switchable retarder arranged to allow the polarisation of each pixel of the display panel to be changed between said first and second polarisations.

26. A display apparatus as claimed in claim 25, wherein said switchable retarder is a liquid crystal cell.

27. A display apparatus as claimed in claim 1 wherein said display panel is arranged to display said first and second images alternately in time.

28. A display apparatus as claimed in claim 27, wherein said direction changing layer is arranged to switch alternately between a first state in which it adjusts the direction of the light forming said first image by said first angle, and a second state in which it adjusts the direction of the light forming said second image by said second angle.

29. A display apparatus as claimed in claim 28, wherein said direction changing layer is a switchable liquid crystal prism layer.

30. A display apparatus as claimed in claim 27,
wherein said display panel further comprises polarisation means which ensures that light from pixels representing said first image has a first polarisation and light from pixels representing said second image has a second polarisation which is different from said first polarisation;
wherein said polarisation means comprises a switchable retarder arranged to allow the polarisation of each pixel of the display panel to be changed between said first and second polarisations;
and wherein the display apparatus is arranged so that said switchable retarder causes said first image to be displayed by the display panel with said first polarisation, and said second image to be displayed by said display panel with said second polarisation.

31. A display apparatus as claimed in claim 27, wherein substantially all of the pixels of the display panel are used for said first image, and also for said second image.

32. A display apparatus as claimed in claim 1, wherein the pixels of the display panel are arranged so that the pixels representing said first image produce light having a first wavelength, or a first plurality of wavelengths, and pixels representing said second image produce light having a second wavelength, or a second plurality of wavelengths, and wherein said direction changing layer is arranged to adjust the direction of light having said first wavelength, or first plurality of wavelengths, by said first angle, and to adjust the direction of light having said second wavelength, or second plurality of wavelengths, by said second angle.

33. A display apparatus as claimed in claim 1, which is arranged to display at least first and second multi-depth images, wherein said display panel produces said first and second images to form said first multi-depth image, and wherein said display panel also produces third and fourth images which form said second multi-depth image.

34. A display apparatus as claimed in claim 33, wherein said direction changing layer comprises a prismatic film comprising a repeating pattern of prism elements;

and wherein said prismatic film comprises at least one prism element having a surface which is used to produce both one of said first and second images and one of said third and fourth images.

35. A display apparatus as claimed in claim 1, wherein said display panel is a multi-view display panel.

36. A display apparatus as claimed in claim 1, wherein said first and second images are produced by only a single display panel.

37. A method of producing at least one multi-depth image using a display apparatus as claimed in claim 1, the method comprising at least the steps of:

a) using said display panel to display a first image in a first range of directions and a second image in a second range of directions, and b) adjusting the direction of the light forming said first image by a first angle, and adjusting the direction of the light forming said second image by a second angle.

* * * * *

UNITED STATES PATENT AND TRADEMARK OFFICE
CERTIFICATE OF CORRECTION

PATENT NO. : 7,639,210 B2
APPLICATION NO. : 11/553078
DATED : December 29, 2009
INVENTOR(S) : Wynne-Powell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 598 days.

Signed and Sealed this

Ninth Day of November, 2010

David J. Kappos
*Director of the United States Patent and Trademark Office*